United States Patent Office 3,387,043
Patented June 4, 1968

3,387,043
HOMOLOGATION PROCESS
Michio Kuraishi, Setsunobu Asano, and Yoshiaki Shinozaki, Niigata, Japan, assignors to Commercial Solvents Corporation, New York, N.Y., a corporation of Maryland
No Drawing. Filed Dec. 28, 1964, Ser. No. 421,675
2 Claims. (Cl. 260—642)

ABSTRACT OF THE DISCLOSURE

A process for the production of an n-alcohol from an n-alcohol having 1 less carbon atom by reacting an n-alcohol of from 2 to 4 carbon atoms with hydrogen and carbon monoxide under conditions of elevated pressure and temperature in the presence of a catalyst, wherein water is added to the starting alcohol before introducing it in the reaction zone.

---

The present invention relates to the homologation reaction of n-alcohols wherein an n-alcohol having one more carbon atom in the molecule than the feed n-alcohol is produced by reacting an n-alcohol having 2 or more carbon atoms in the molecule with hydrogen and carbon monoxide in a reaction zone in the presence of a soluble cobalt catalyst and a halogen or a halogen compound, and adding water to the reaction zone.

The production of ethanol by reacting methanol with hydrogen and carbon monoxide at pressures of from 200 to 1000 atmospheres gauge and at temperatures of from 150 to 300° C. in the presence of a soluble cobalt catalyst and a halogen or halogen compound is widely known as methanol homologation. The homologation reaction proceeds to a considerable extent when using tert-butanol or benzyl alcohol instead of methanol as the starting material; however, it has been observed that little reaction takes place with ethanol and only an extremely small reaction occurs with n-propanol and n-butanol as starting materials. (Ref. J. Berty et al., Chem. Tech., 8, 260, 1956.)

The homologation reaction of methanol does not proceed beyond ethanol as has been proven through experiments. In methanol homologation, though small amounts of n-propanol and n-butanol are formed in the reaction mixture when longer contact time and higher pressure are adopted, according to the literature which has been reported up to the present, the n-propanol is produced from olefinic dehydration product of ethanol (probably ethylene) and the n-butanol is produced from acetaldehyde through croton aldehyde. (Ref. K. H. Ziesecke, Brenstoff Chem., 33, 385, 1952, J. Berty et al., Chem. Tech., 8, 260, 1956, I. Wender et al., Catalysis V, 87, 1956.)

During the study of the methanol homologation reaction the present inventors have found that the homologation reaction will effectively proceed with an n-alcohol other than methanol when water is added to the feed alcohol. A detailed explanation of this reaction with ethanol as the starting n-alcohol is as follows:

Ethanol was reacted with hydrogen and carbon monoxide under the same conditions usually used during methanol homologation; for example, in the presence of cobalt acetate and iodine, a total gas pressure of from 180 to 250 atmospheres and a temperature of from 180 to 205° C. These reaction conditions were maintained for 6 hours. No further gas absorption was noted 6 hours after the reaction was started. The reaction mixture was cooled and the liquid fraction was analyzed by gas chromatography. Only a slight amount of n-propanol was observed. However, when an almost equi-molar amount of water was added to the ethanol and the reaction was carried out under the same reaction conditions, about 20% of the ethanol reacted in 2 hours of reaction time, and more than 50% of the reacted ethanol was converted into n-propanol. In this case diethylether, ethyl acetate and propionaldehyde were produced as by-products but the propionaldehyde can easily be converted to n-propanol. In this reaction, it has also been observed that a higher pressure will cause a higher reaction rate and better selectivity, as has been observed in the methanol homologation reaction.

In accordance with the present invention, water is added to the reaction zone during the ethanol homologation reaction. In general, the water is added in amount effective to increase the amount of n-propanol produced. The preferred water concentration is from about 10 to about 60 mole percent (based on the n-alcohol feed). The highest conversion of ethanol into $C_3$ compounds is observed at about 20 mole percent of water however, in this case the yield of n-propanol is relatively low and the formation of ethers like ethyl ether or propyl ether or various esters is rather high, consequently the selectivity is low. However, when the water concentration is about 40 mole percent, the reaction rate is somewhat lower but the maximum yield of n-propanol is observed. This reaction begins at about 150° C., proceeds effectively at 180° C., the maximum reaction rate is obtained at around 200° C., the reaction rate becomes lower at temperatures above 220° C., and temperatures above about 300° C. are not preferred.

Cobalt or its compounds and halogen and its compounds are used as catalysts in this reaction like in the well-known homologation reaction. Cobalt salts which are soluble in the feed alcohol are preferred. Preferred soluble salts are the acetate, bromide, chlorate, chloride, iodide, linoleate, propionate, sulfide, etc. Cobalt acetate is specifically preferred because it is especially effective with reference to conversion and reaction time. The halogens iodine, bromine, chlorine or their compounds can be used. The alkali metal and alkaline earth metal iodides, bromides, and/or chlorides are preferred. In general, from about 1 to about 20 mg. atom of cobalt/1 mole of feed n-alcohol are suitable. Also, in general, the higher concentrations give higher ethanol conversion but when considering the yield of n-propanol, from about 5 to 10 mg. atom of cobalt/1 mole feed ethanol is most preferable.

Though the reaction proceeds without adding a promoter such as iodine or iodides, considering the conversion and reaction time the said promoter is preferable. Potassium iodide, lithium iodide, calcium iodide, are specific examples of alkali or alkaline earth metal iodides that are considered to be effective. The halogen is present in amount from about 0.5 to about 5.0 mg. atom of halogen per mole of feed n-alcohol. The specifically preferred concentration is about 0.5 gram-atom iodine/1 mole cobalt. When the cobalt and iodine content increases above these amounts, higher conversions can be obtained but the yield of n-propanol will usually become lower and the reactor will be badly corroded.

An n-alcohol other than ethanol such as n-propanol or n-butanol also reacts with carbon monoxide and hydrogen without adding water but the so-called homologation reaction proceeds only slightly. However, when in accordance with this invention the reaction is carried out with the addition of from about ½ to 1 mole of water/mole of alcohol under the same reaction conditions, the overall conversion of the alcohol increases to some extent but the selectivity of the reaction to produce the n-alcohol having 1 more carbon atom in the molecule markedly increases.

The following examples are given to illustrate the present invention. All percents are weight percents.

EXAMPLE I

Reaction conditions:
Reactor: acid proof autoclave.
Charged materials: ethanol 1.39 mole, water 1.03 mole.
Catalyst: cobalt acetate 0.010 mole/mole ethanol iodine 0.005 mole/mole ethanol.
Raw gas composition: $H_2/CO$ mole ratio of 1.20/1.0.
Pressure: 400 kg./cm.$^2$ gauge.
Temperature: 220° C.
Reaction time: 3 hours.

By exhausting 15 liters/hour of gas from the autoclave and at the same time charging the autoclave with raw gas to keep a constant pressure in the autoclave, the composition of the gas in the reactor can be kept substantially constant during the reaction. The ethanol conversion was 27.2% at the end of 1 hour, 50% at the end of 2 hours and 66% at the end of 3 hours after the reaction was started. The yield of n-propanol was 14.8% at the end of 1 hour, 21.7% at the end of 2 hours and 27.3% at the end of 3 hours, respectively, after the reaction was started. Consequently the selectivity of conversion of ethanol into n-propanol was 54.3%, 43.4% and 41.3%, respectively. The yield of n-butanol was 1.5% at the end of 2 hours and 3.0% at the end of 3 hours after the reaction was started. The main by-products were diethylether, ethyl-n-propylether, ethyl acetate and isobutanol.

EXAMPLE II

Into a 100 cc. acid proof autoclave, 16 cc. of a mixture of ethanol and water having a 56:44 mole ratio was placed, and then 0.005 mole of cobalt acetate and 0.0013 mole of iodine/mole of ethanol were added. After charging the autoclave with a gas having a mole ratio of $H_2/CO$ of 1.24/1.0 up to 240 kg./cm.$^2$, the reaction mixture was reacted for 2 hours at a temperature of 200° C. The ethanol conversion was 16.7% and the n-propanol formation was 8.6% (51.6% of the converted ethanol) as determined by analysis of the products. The by-products were diethylether, ethyl-n-propylether, ethyl acetate and propionaldehyde.

EXAMPLE III

Into a 100 cc. acid proof autoclave, 16 cc. of a mixture of ethanol and water having a 57:43 mole ratio was placed, and 0.005 mole of cobalt acetate and 0.0026 mole of potassium iodide/mole of ethanol were added. After charging the autoclave with a gas having a mole ratio of $H_2/CO$ of 1.28/1.0 up to 240 kg./cm.$^2$, the reaction mixture was reacted for 2 hours at a temperature of 200° C. The ethanol conversion was 21.2% and the n-propanol formation was 8.0% (37.7% of the converted ethanol) as determined by the analysis of the products.

EXAMPLE IV

Sixteen cc. of a mixture of ethanol and water having a 65:35 mole ratio was placed in the same acid proof autoclave used in Example III and 0.005 mole of cobalt acetate was added. Then the charge gas having a mole ratio of $H_2/CO$ of 1.28/1.0 was charged into the autoclave up to 240 kg./cm.$^2$, and the reaction mixture was then reacted for 2 hours at a temperature of 200° C. The ethanol conversion was 15% and the n-propanol formation was 1.5% (10% of the converted ethanol) propionaldehyde formation was 1.0% (6.7% to converted ethanol) as determined by analysis of the products.

EXAMPLE V

Into a 100 cc. acid proof autoclave 16 cc. of a mixture n-propanol and water having a 65:35 mole ratio was placed, and 0.005 mole of cobalt acetate and 0.0013 mole of iodine/mole of feed alcohol were added. After charging the autoclave with a gas having a mole ratio of $H_2/CO$ of 1.28/1.0 up to 240 kg./cm.$^2$, the reaction mixture was reacted for 2 hours at a temperature of 200° C. The n-propanol conversion was 10.1% and the n-butanol formation was 3.3% (32.2% of the converted propanol). On the other hand when n-propanol was reacted without adding water under the same conditions the n-propanol conversion was only 9.9% and the n-butanol formation was only 0.6% (6.2% of the converted propanol).

EXAMPLE VI

Sixteen cc. of a mixture of n-butanol and water having a 1:1 mole ratio was placed in an acid proof autoclave and the reaction mixture reacted under the same conditions given in Example V except that twice as much catalyst was used. The n-butanol conversion was 17.2% and the n-amyl alcohol formation was 5.3% (31.4% of the converted butanol) as determined by analysis of the products. On the other hand, when n-butanol was reacted without adding water under the same reaction conditions, the n-butanol conversion was only 16.9% and the n-amyl alcohol formation was only 0.7% (4.1% of the converted butanol).

What we claim is:

1. In a process wherein a first n-alcohol selected from the group consisting of ethanol, n-propanol and n-butanol is reacted with hydrogen and carbon monoxide to produce a second n-alcohol having 1 more carbon atom in the molecule than the starting n-alcohol, whereby said hydrogen and said carbon monoxide are reacted in a reaction zone under a pressure within the range of from about 200 to about 1000 atmospheres and a temperature within the range of from about 150° C. to about 300° C. in the presence of a catalyst comprising cobalt acetate with iodine or potassium iodide, said cobalt acetate being present in a ratio of about 0.005 mole per mole of said first n-alcohol, and said iodine or potassium iodide being present in a ratio of about 0.0013 to 0.005 mole per mole of said first alcohol, the improvement which comprises adding from 0.5 to about 1 mole of water per mole of said first n-alcohol prior to said reaction to increase the amount of said second n-alcohol formed during the reaction.

2. The improvement of claim 1 wherein the starting alcohol is ethanol.

References Cited

UNITED STATES PATENTS

| | | | |
|---|---|---|---|
| 2,623,906 | 12/1952 | Gresham | 260—642 |
| 3,285,946 | 11/1966 | Butter | 260—642 |

FOREIGN PATENTS 877,598  5/1953  Germany.

OTHER REFERENCES

Wender et al., "Science", vol. 113 (1951), pp. 206–7.

BERNARD HELFIN, *Acting Primary Examiner.*

LEON ZITVER, *Examiner.*

J. E. EVANS, *Assistant Examiner.*